(12) United States Patent
Regen et al.

(10) Patent No.: US 6,543,435 B1
(45) Date of Patent: Apr. 8, 2003

(54) COLLAPSIBLE MULTI-LEVEL BARBEQUE GRILL, OVEN AND SMOKER SYSTEM

(75) Inventors: Paul Lewis Regen, Felton, CA (US); Everett Harold Hale, Ben Lomond, CA (US)

(73) Assignee: Ennova Corporation, Lake Tahoe, NV (US)

( * ) Notice: Subject to any disclaimer, the term of this patent is extended or adjusted under 35 U.S.C. 154(b) by 0 days.

(21) Appl. No.: 10/185,533

(22) Filed: Jun. 27, 2002

(51) Int. Cl.$^7$ ................................................ F24C 5/20
(52) U.S. Cl. ...................... 126/25 R; 126/9 R; 126/38
(58) Field of Search ............................... 126/25 R, 9 R, 126/38, 276, 41 R (56) References Cited

U.S. PATENT DOCUMENTS

| | | | | |
|---|---|---|---|---|
| 4,014,315 A | * | 3/1977 | Lagunilla | 126/275 R |
| 4,185,748 A | * | 1/1980 | Vache et al. | 220/8 |
| 4,587,947 A | * | 5/1986 | Tomita | 126/25 R |
| 4,962,697 A | * | 10/1990 | Farrar | 99/340 |
| 5,363,977 A | * | 11/1994 | Hoff | 220/4.27 |

* cited by examiner

Primary Examiner—Henry Bennett
Assistant Examiner—Alfred Basichas
(74) Attorney, Agent, or Firm—Donald R. Boys; Central Coast Patent Agency, Inc.

(57) ABSTRACT

A cooking system for outdoor cooking has a body for enclosing items to be cooked, and one or both of a charcoal pan and a gas burner for providing heat for cooking. The system is characterized in that the body is formed of a plurality of ring segments of sequentially smaller size, arranged such that the body may be collapsed telescopically to form a cooking chamber of a first height, or extended from the collapsed state to form a cooking chamber of a second, substantially greater height.

14 Claims, 12 Drawing Sheets

COLLAPSIBLE MULTI-LEVEL BARBEQUE GRILL, OVEN AND SMOKER SYSTEM

FIELD OF THE INVENTION

The present invention is in the field of outdoor grilling and smoking equipment and pertains more particularly to a collapsible multi-level barbeque grill and smoking system for outdoor use.

BACKGROUND OF THE INVENTION

The field of outdoor cooking, particularly grilling and smoking, boasts a wide variety of cooking equipment in the current art. Probably the most notable of these is the standard barbeque grill comprising a charcoal container, a grill and a lid. More complicated grill systems are available that use propane for fuel. Conventionally, these grilling systems have a hinged door and one or two grilling racks disposed above gas burners, and may be built onto carts that enable the system to be moved. Also in the art are traditional barrel type grill and smoker systems. These systems use charcoal and are constructed in the form of a single deep barrel and suspending apparatus for suspending two or more charcoal containers, drip pans, and grill racks usually in vertical arrays.

All three types of apparatus described above have functional limitations. Each also has one or more limitations with respect to convenience of use and portability. For example, large gas systems are not readily portable and are limited in flexibility with respect to the amount and variety of foods that can be prepared simultaneously. The small barbeque grill is readily portable, but is severely limited in food preparation function (grilling) and space for grilling. The barrel style of apparatus increases the space available for food preparation and has some flexibility with respect to the variety of foods that can be prepared simultaneously, however it is not easily portable.

What is clearly needed in the art is an outdoor grill, oven and smoker system that is easily portable, increase cooking space, and allows for multiple varieties of food to be prepared in the same cooking time using the same apparatus disposed, perhaps, in a different geometrical format.

SUMMARY OF THE INVENTION

In a preferred embodiment of the invention a cooking system for outdoor cooking is provided, comprising a body for enclosing items to be cooked, and one or both of a charcoal pan and a gas burner for providing heat for cooking. The system is characterized in that the body is formed of a plurality of ring segments of sequentially smaller size, arranged such that the body may be collapsed telescopically to form a cooking chamber of a first height, or extended from the collapsed state to form a cooking chamber of a second, substantially greater height.

In a preferred embodiment the system a gas burner unit having two or more separate manifolds and burners, and a valved control system for feeding gas selectively to one or more of the manifolds and burners. There may also be automatic spark lighting system operable in conjunction with the valved control system. In a preferred embodiment of the valved control system, a single knob feeds gas to the burners selectively, depending on the rotary positions of the knob.

In some embodiments the system has both a charcoal pan and a gas burner system. Also in a preferred embodiment an upper ring segment has pins and a lower ring segment has slots, one or more of the slots having a horizontal as well as a vertical component, such that the lower segment may be raised, collapsing intervening segments telescopically, and the slots may be engaged on the pins to hold the unit collapsed.

In some embodiments there is a domed lid for covering the body in use. There may further be a wheeled carriage assembly for supporting the system in use and/or for portability. The body in some cases mounts to the carriage assembly by two or more downward-facing brackets, fitting over a cross-member of the carriage. A portion of the wheeled carriage assembly may be foldable upon itself to facilitate convenience in storage.

In some embodiments of the system there are a plurality of grill racks and supports for the racks at various heights within the extended body. There may further be a lift handle assembly for attaching to and elevating a grill rack or cover above the body and moving the rack or cover to one side of the system. In some cases there are one or more suspension hooks for suspending food items from a grill rack down into the body.

In another aspect of the invention a method for enhancing functionality of an outdoor cooking system having a body for enclosing items to be cooked is provided, comprising the steps of (a) forming the body in a plurality of ring segments of sequentially smaller size; (b) arranging the segments such that the body may be collapsed telescopically to form a cooking chamber of a first height, or extended from the collapsed state to form a cooking chamber of a second, substantially greater height.

In embodiments of the invention described in enabling detail below, for the first time a height-adjustable outdoor cooking and smoking system is provided substantially increasing the functionality of such units currently known in the art.

DESCRIPTION OF THE PREFERRED EMBODIMENTS

According to a preferred embodiment of the present invention, a collapsible and extendable outdoor cooking system is provided that is easily portable and versatile with respect to outdoor food preparation.

Figure 1:
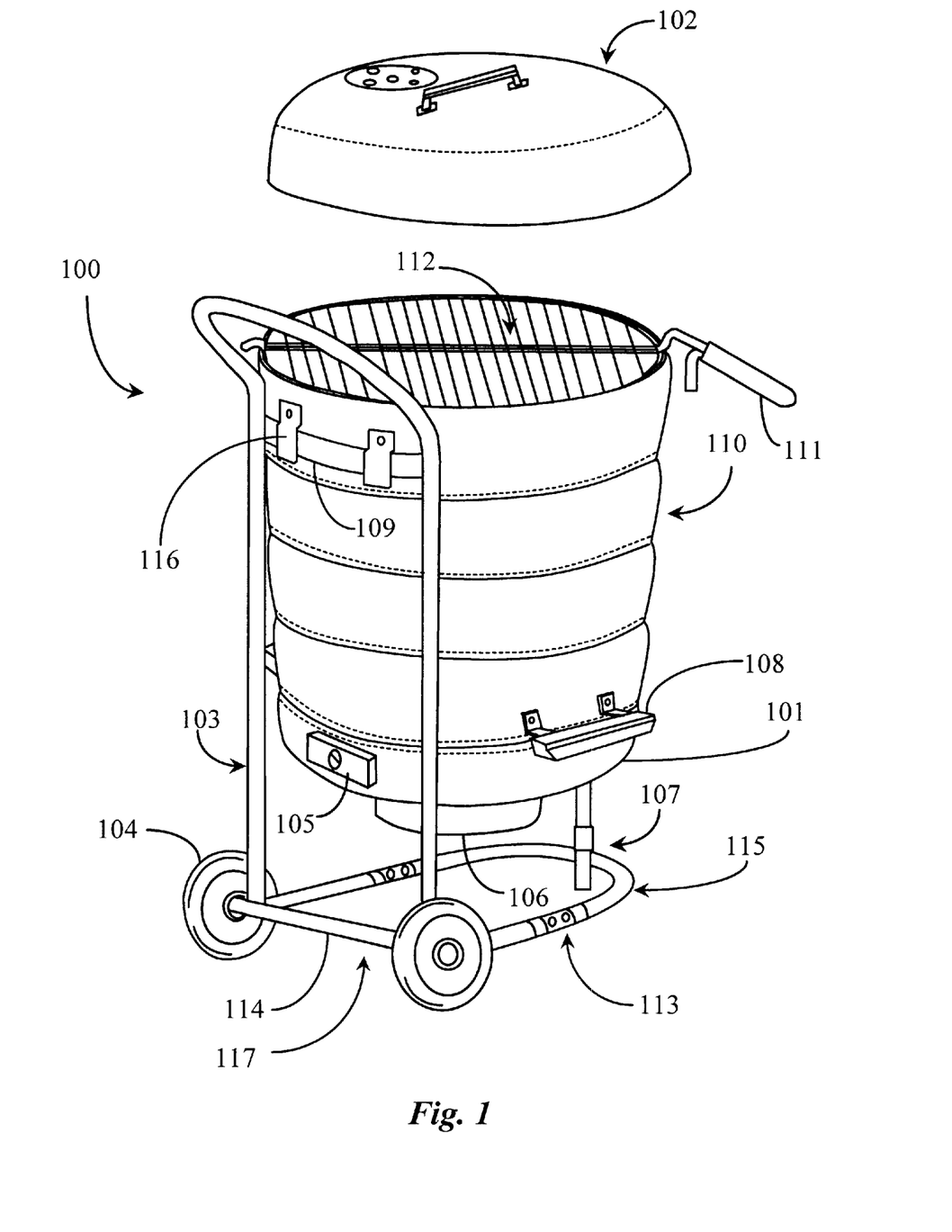
FIG. 1 is a perspective view of a collapsible barbeque system and stand according to an embodiment of the present invention.

FIG. 1 is a perspective view of a collapsible barbeque system 100 and stand 103 according to an embodiment of the present invention. Barbeque system 100 is provided as a multi-use, outdoor cooking system. System 100 employs the various features of a grill, a smoker and an oven, combining these features into one easily portable and versatile outdoor cooking unit.

System 100 comprises a compound body 110 made up of interconnected segments or rings telescopically assembled and connected to a bottom element 101. A cover 102 is provided to cover the system for oven-type cooking and for smoking. Telescopic ring construction of body 110 enables a user to collapse system 100 upon itself or to extend system 100 from a collapsed state to a fully extended cooking depth for achieving a variety of cooking purposes. Body 110 assumes a deep barrel configuration when fully extended. Each segment of body 110 in a preferred embodiment is formed of sheet metal in a barrel shaped construction. Body 110 in a preferred embodiment also has 2 diametrically opposed lift handles 108 (one visible) affixed thereto by bolting or other fastening method. The handles enable a user to collapse the system from full extension to a state of lesser extension, as well as serving as carrying handles when body 110 is fully collapsed and removed from stand 103.

System 100 utilizes at least one grill rack 112 for supporting food items for outdoor grilling and smoking. Each barrel-shaped segment or ring supports a grill rack with the system at full extension. In this example, when fully extended, 5 racks analogous to rack 112 can be simultaneously supported. Therefore, system 100 when fully extended, provides substantially more cooking space than outdoor cooking systems of current art while at the same time remaining easily portable.

System 100 is provided both as a gas system and as a charcoal system, in preferred embodiments in the same unit. For gas cooking, system 100 has at least two gas burners (not illustrated in FIG. 1, but following) installed in grill bottom 101. A gas control system 105 is provided and affixed to bottom element 101. A control system 105 is provided to enable ignition and heat control for the burners. Standard propane supply equipment is not illustrated herein, but may be assumed to be present. In another embodiment, a charcoal holder (not seen in FIG. 1) is provided to enable charcoal cooking, and can be placed at the level of any of the cooking segments when the system is fully extended. A charcoal ash catcher 106 is provided and attaches underneath bottom element 101 and catches ash from charcoal operation and/or wood-chip smoking operation.

System 100 is designed to be mounted to stand 103 for purposes of portability and for stability when cooking. Stand 103 is, in this example, of tubular construction. Stand 103 is configured and operational in the manner of a hand-truck with a user handle (angled portion) so that system 100 can be easily moved about. Body 110 has at least 2 clips 116 affixed thereto on one side, which are adapted to mount the system to stand 103 by way of a mounting strip 109 welded or otherwise fixedly attached to stand 103. Stand 103 includes a wheelbase assembly and base portion 117. The wheelbase assembly comprises 2 wheels 104 mounted to an axle 114. Base portion 115 is welded or otherwise affixed to axle 114 and includes a combination foot and rod support member 107 adapted to stabilize system 100 on the ground and to receive a removable body support arm (not visible in this view) for supporting the opposite side of body 110 on stand 103 in a similar manner and with similar hardware described with respect to clips 116 and support strap 109.

When not in use, base portion 115 is in a preferred embodiment folds upon itself at a pair of hinged base joints 113, which are designed to be rigid as extended in the positions shown. Folding capability of base portion 115 enables more compact storage and easier portability of stand 103 by itself. A rack lift handle and rod assembly 111 is provided with system 100 enabling a user to lift a rack (112) or cover 102 from system 100 while in use and suspend the rack or cover above the system and additionally to swing the rack or cover out in either direction, such that the apparatus is positioned out to a side of and away from system 100. For example, rack 112 may be loaded with food items to be cooked and swung away from heat associated with cooking for the purpose of checking, seasoning, or serving food. The rod portion of lift handle 111 is illustrated as cut off in this example but in actual use fits into a sleeve (not visible) provided on the previously mentioned stand arm that fits into foot 107 when supporting body 110. More detail regarding this portion of stand 103 is provided later in this specification.

Figure 2A:
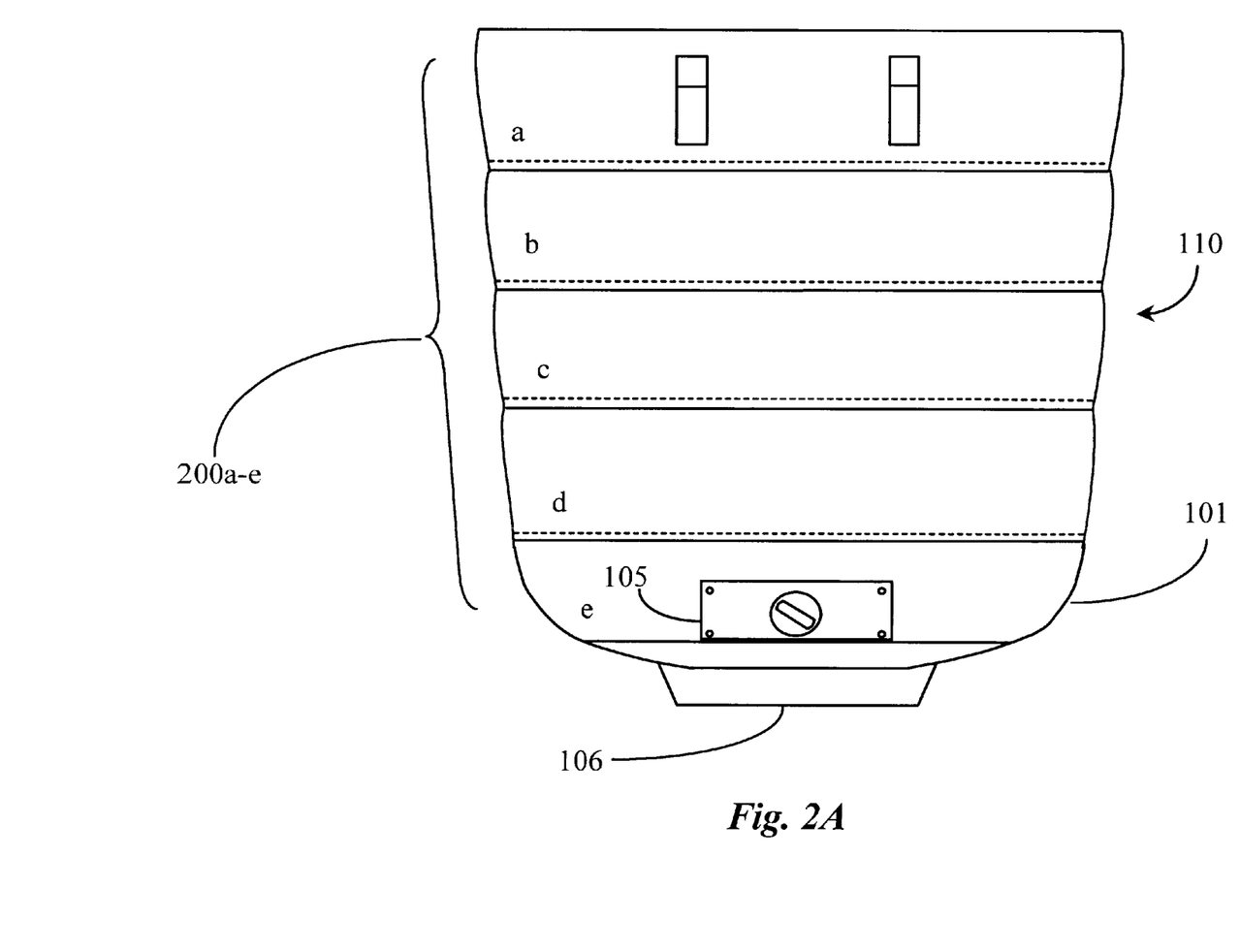
FIG. 2A is a plan view of a body 110 of the system of FIG. 1 illustrating a plurality of barrel shaped body segments or rings.

FIG. 2A is a plan view of unique telescoping body 110 of the system of FIG. 1, illustrating a plurality of barrel shaped segments or rings 200a–e. Body 110 as previously described with reference to FIG. 1 above is collapsible upon itself. Telescopic barrel construction (ring configuration) of successively smaller diameter enables body 110 to be collapsed upon itself to form a shallow cooking volume for grilling, and to be extended to a full barrel depth for multi-rack grilling, smoking, oven style cooking, and so on. In this example, barrel sections 200b, 200c, and 200d collapse to form one cooking space between grill bottom 101, which houses the gas burners and ignition control box 105 and segment 200a which forms the top-most grilling section.

More particularly, barrel section 200a collapses over section 200b, which collapses over section 200c, which collapses over section 200d that supports the lift handles 108 described with reference to FIG. 1 above. In a fully collapsed mode, body 110 assumes the profile of a single rack barbeque grill. When fully extended as seen in this example, body 110 assumes the profile of a barrel smoker or multi-rack cooker. It is noted herein that section 200d is somewhat greater in height with respect to the other cooking rings. This difference in height is to enable ring 200d to be secured to section 200a after collapsing, using a pin-to-slot shelving arrangement which is described in more detail below.

Figure 2B:
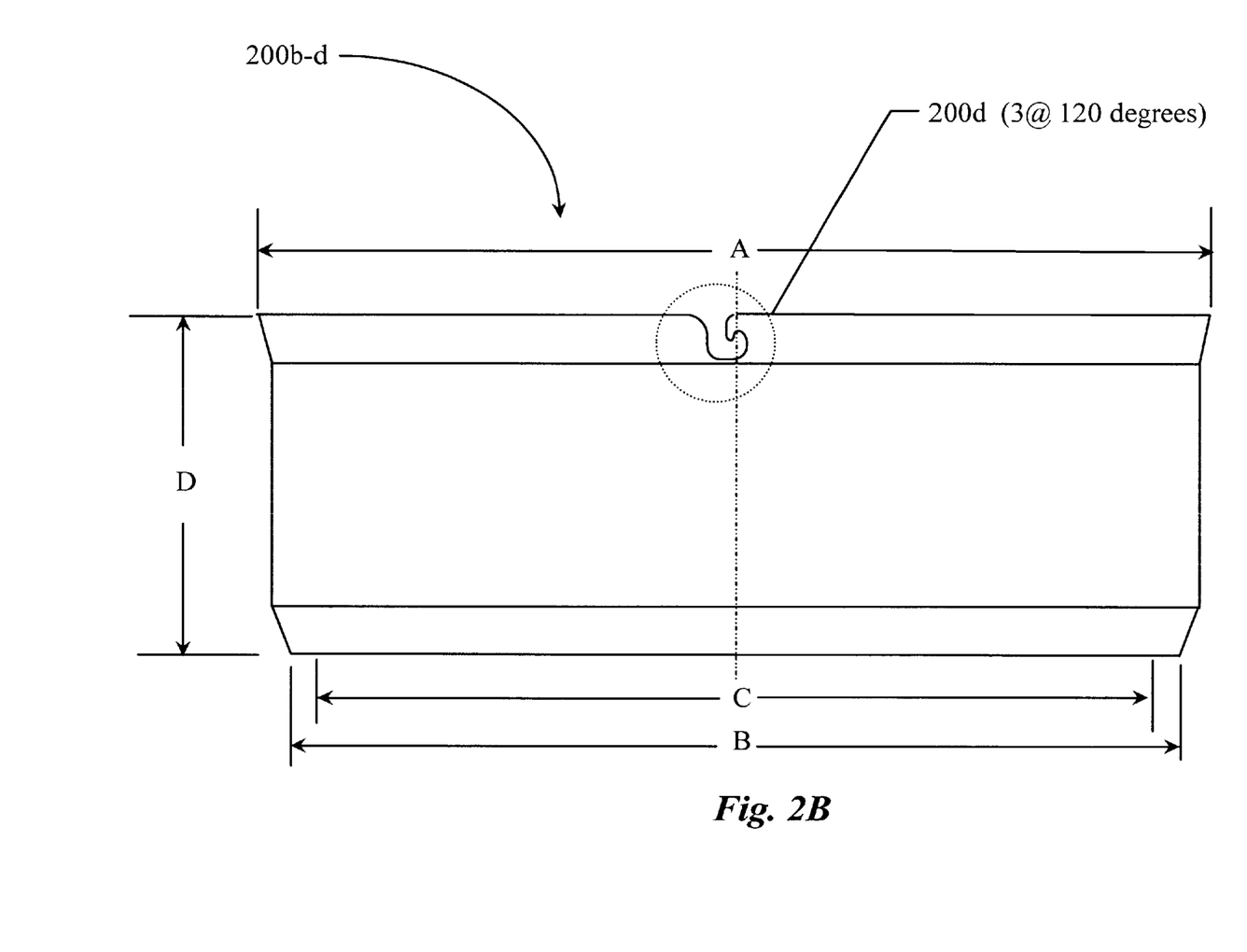
FIG. 2B is an elevation view of a single ring used in the telescopic potion of system 100 of FIG. 1.

FIG. 2B is an elevation view of a typical telescopic ring used in the telescopic portions of system 100 of FIG. 1. Cooking sections 200b–d are formed in the ring configuration for this example. The ring configuration consists of a flared-out section on top denoted herein by the outside diameter A, followed by a body section denoted herein by the outside diameter B, followed by a flared in section denoted herein by an inner diameter C. An overall height dimension for the ring configuration is expressed with the height dimension D. Although in this example there is a constant diameter D for most of the height of the section, in various embodiments there may be a taper, or curved sides creating the effect seen in FIG. 2A.

It is important to note herein that the actual dimensions used in the ring configuration are different for each section identified as 200b, 200c, or 200d. For example, section 200b has the largest diameter dimensioning so that it can be seated over section 200c. Section 200d has the smallest diameter dimensioning so that it can be raised up to contain collapsed sections 200b and 200c. Section 200d is the section that supports the lift handles 108 of FIG. 1.

Section 200d has a slot configuration placed there through at three places around the upper periphery at about equal 120-degree spacing, and located in the flared section at the top of the ring. These slots are adapted to engage 3 strategically-placed pins (not shown) mounted also at 120 degree intervals and protruding inward around the inner wall of section 200a. Referring now to FIGS. 1 through 2B, operation is such that a user lifting on handles 108 of FIG. 1 raises section 200d to contain sections 200c and 200b collapsed therein to form one cooking space. The top flare of section 200d fits up inside the bottom portion of section 200a supporting the pins. The pins may be at any convenient height inside section 200a to receive the slots of section 200d. The higher the pins are placed, the lesser the height of the collapsed unit.

By lifting section 200d above the pins disposed inside section 200a (with sections 200b and 200c collapsed therein) and rotating the section somewhat, section 200d is caused to rest on the pins mounted to section 200a with sections 200b and 200c collapsed within to form one cooking space for such as single-rack grilling. The overall height dimension D of section 200d is somewhat larger than the other sections to enable the extra distance for the slots to engage the mounted pins. The other sections do not have these slots, and are stopped from upward progression by the pins on section 200a. Only section 200d can be raised above the level of the pins. By reversing the operation system 100 is extended. When system 100 is extended, the flares in each ring hold the system together.

Figure 3:
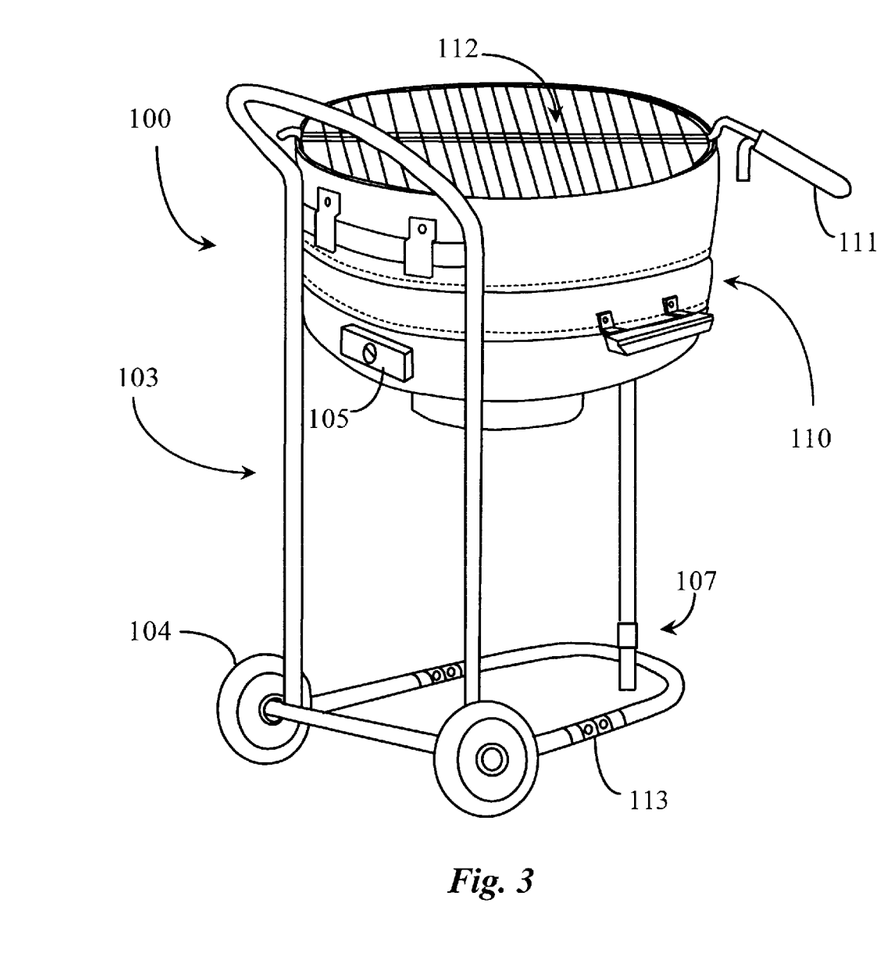
FIG. 3 is a perspective view of the cooking system of FIG. 1 illustrated in a collapsed state for single-rack charcoal or gas grilling.

FIG. 3 is a perspective view of the system 100 of FIG. 1 in a collapsed state for single-rack charcoal or gas grilling. System 100 is lockable in this configuration by virtue of a pin-slot system described above and explained in more detail later in this specification. In this example, barrel segments (200b–d) form one segment. In one embodiment, stand 103 may be equipped with a lever-operated braking system (not shown) for application of lockable brakes to the wheelbase assembly when supporting body 110 for use in cooking. Also not shown are levers for dispensing ash from a charcoal pan and a system thermometer for measuring heat range. Although such accessories are not illustrated in this example, they may be assumed to be present.

Figure 4:
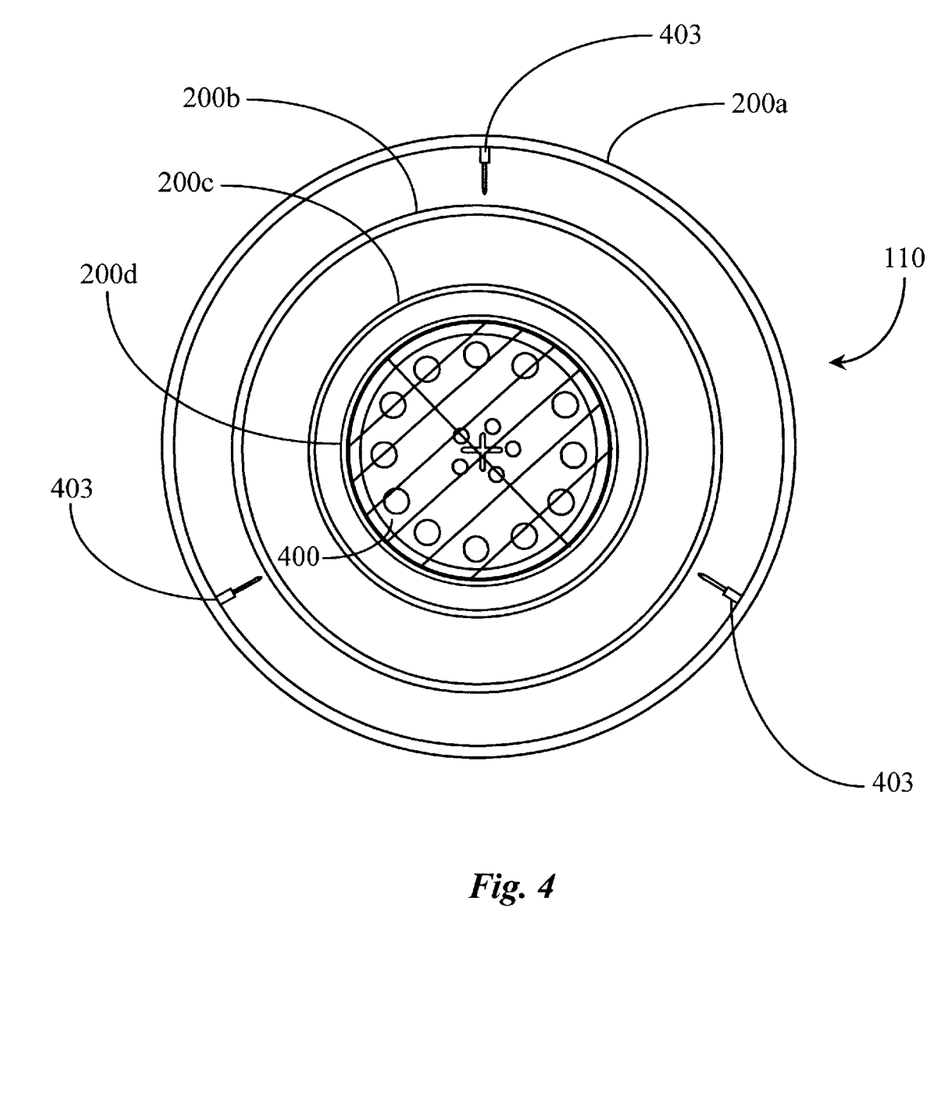
FIG. 4 is an overhead plan view of body 110 of FIG. 2A illustrating a heat baffle/charcoal pan and single grill rack at a fully extended position.

FIG. 4 is an overhead view of body 110 of FIG. 2A illustrating a heat baffle/charcoal pan and single grill rack with the system at a fully-extended position. A heat baffle 400 is provided in this embodiment to seat just above a set of gas burners (not shown) at the lowermost grilling position in section 200d. Baffle 400 is designed with an array of holes therethrough to allow heat from the burners to enter the cooking section but to mask the burners from drippings. Baffle 400 has a cross opening formed at its center to allow an operator to raise and lower the baffle, as well as to turn the baffle with a typical t-handle (not shown).

Section 200a has three pins 403 rigidly mounted thereto in a 120-degree spacing pattern around the inside wall, protruding inward. Pins 403 are analogous to the pins mentioned above with reference to FIGS. 2A and B. Pins 403 act as stops to halt the upward progression of sections 200b and 200c as the system is collapsed, by virtue of the fact that these sections are not slotted. A single rack is illustrated at section 200d above baffle 400. Additional grilling racks, when the system is extended, may be placed at the respective cooking planes of sections 200c, 200b, and 200a as well. Charcoal can be placed on top of baffle 400 using charcoal rings (not shown) adapted for the purpose. Charcoal can be ignited through the baffle using the gas burners.

Figure 5:
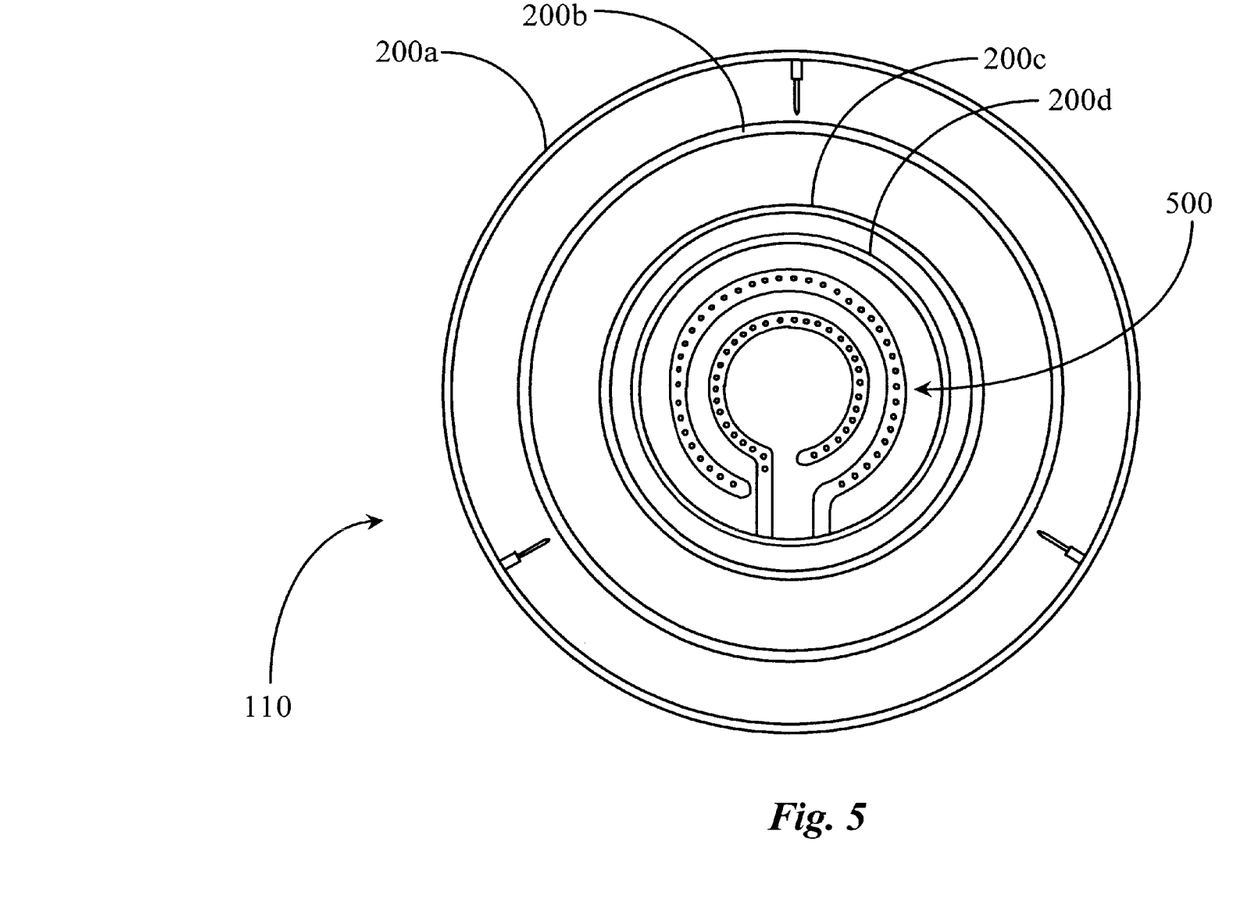
FIG. 5 is an overhead plan view of the system of FIG. 4 with the baffle removed exposing a dual gas manifold and burner system.

FIG. 5 is an overhead view of body 110 of FIG. 4 with baffle 400 removed, exposing a dual gas manifold and burner system 500. Body 110 is illustrated in a fully extended state as was described above with respect to FIG. 4. Manifold system 500 comprises an inner gas manifold and an outer gas manifold. Each manifold of system 500 is separately ignitable and controllable from gas ignition box (105) described with reference to FIG. 1. In one cooking instance perhaps only the center manifold is required while in another instance the outer manifold will be employed. In another embodiment, both manifolds may be operable at the same time for more heat output. Each manifold has a plurality of gas openings to permit gas flow in typical fashion. Manifold system 500 is held in place by retaining clips not illustrated in this embodiment. A valving system is employed that allows one rotary knob to control gas flow to the separate manifolds; a lower setting feeding gas to only one manifold, and a higher setting feeding gas to both manifolds. There is, in addition, an electric spark ignition system for igniting the gas automatically with turning of the valve control knob.

In use, because of the high-output burner system, capable of in excess of 700 degrees F., the system can be operated in a self-cleaning mode, in which residue in the system is reduced to ash for easy removal.

In addition to baffles and grill racks, charcoal holders and drip pans may be inserted into body 110 and retained at the multiple cooking planes that are accessible in a fully extended configuration.

Figure 6:
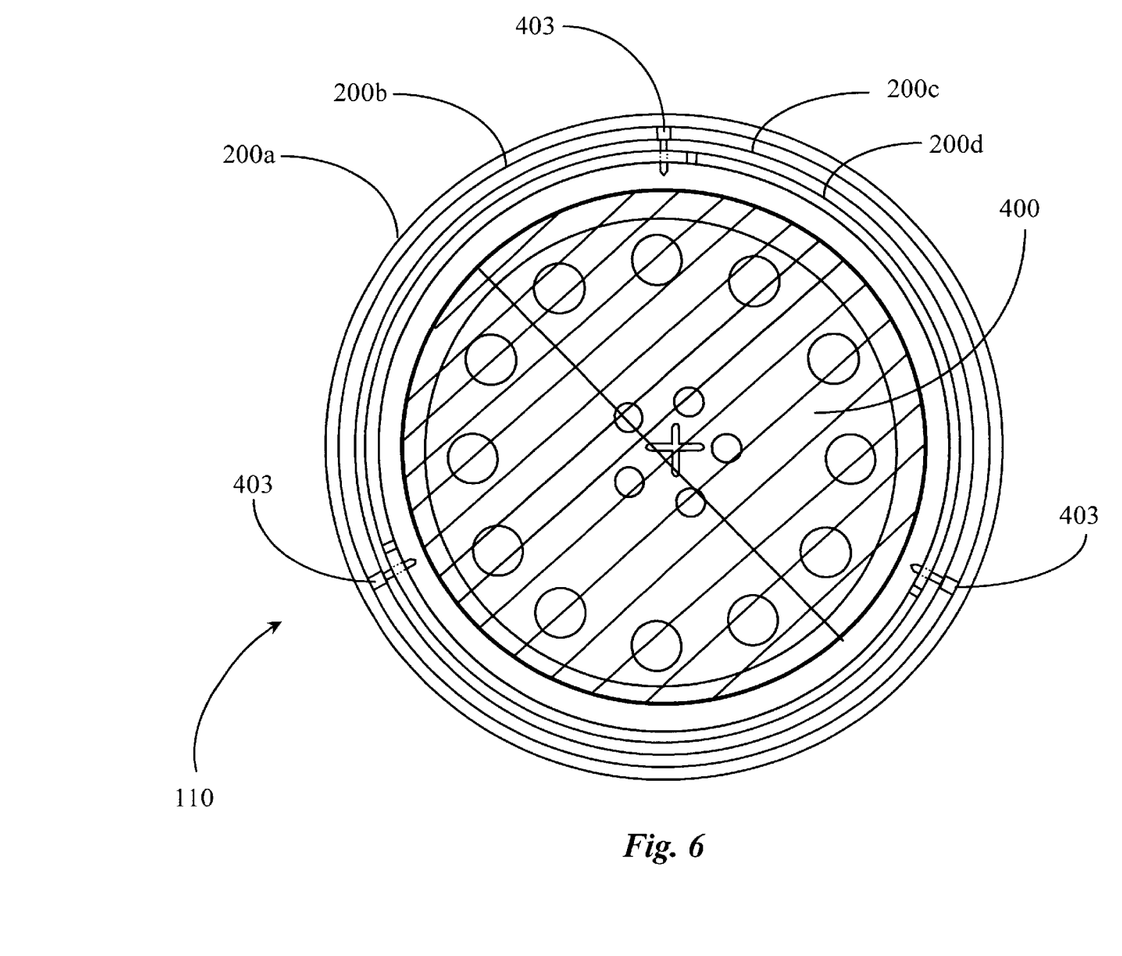
FIG. 6 is an overhead plan view of the system of FIG. 5 illustrated in a collapsed position shelved on pins for single-rack grilling.

FIG. 6 is an overhead view of body 110 of FIG. 5 illustrated with the system in a collapsed configuration and shelved on pins for single-rack grilling. Cooking segment 200d is illustrated as shelved on pins 403, which are rigidly mounted to cooking segment 200a. Cooking segments 200b and 200c are prevented from being lifted above pins 403 by virtue of the fact that they are not slotted for engagement. However, segment 200d is engaged on pins 403, and the slot openings associated with the engagement position are partially visible in this example. Lift handles 108 mounted to segment 200d are not illustrated in this example but may be assumed to be present. In this particular example, pins 403 are rigidly mounted to the inside surface of segment 200a in a 120 degree array. However in other embodiments they may be removably mounted. In another embodiment they are accessible from the outside of cooking segment 200a such as, perhaps spring loaded and retractable by knob handles or the like. There are many possibilities. In use, one may further employ hanging baskets for items to be cooked, and the baskets can be suspended from the rack mounted near the top of the system.

Figure 7:
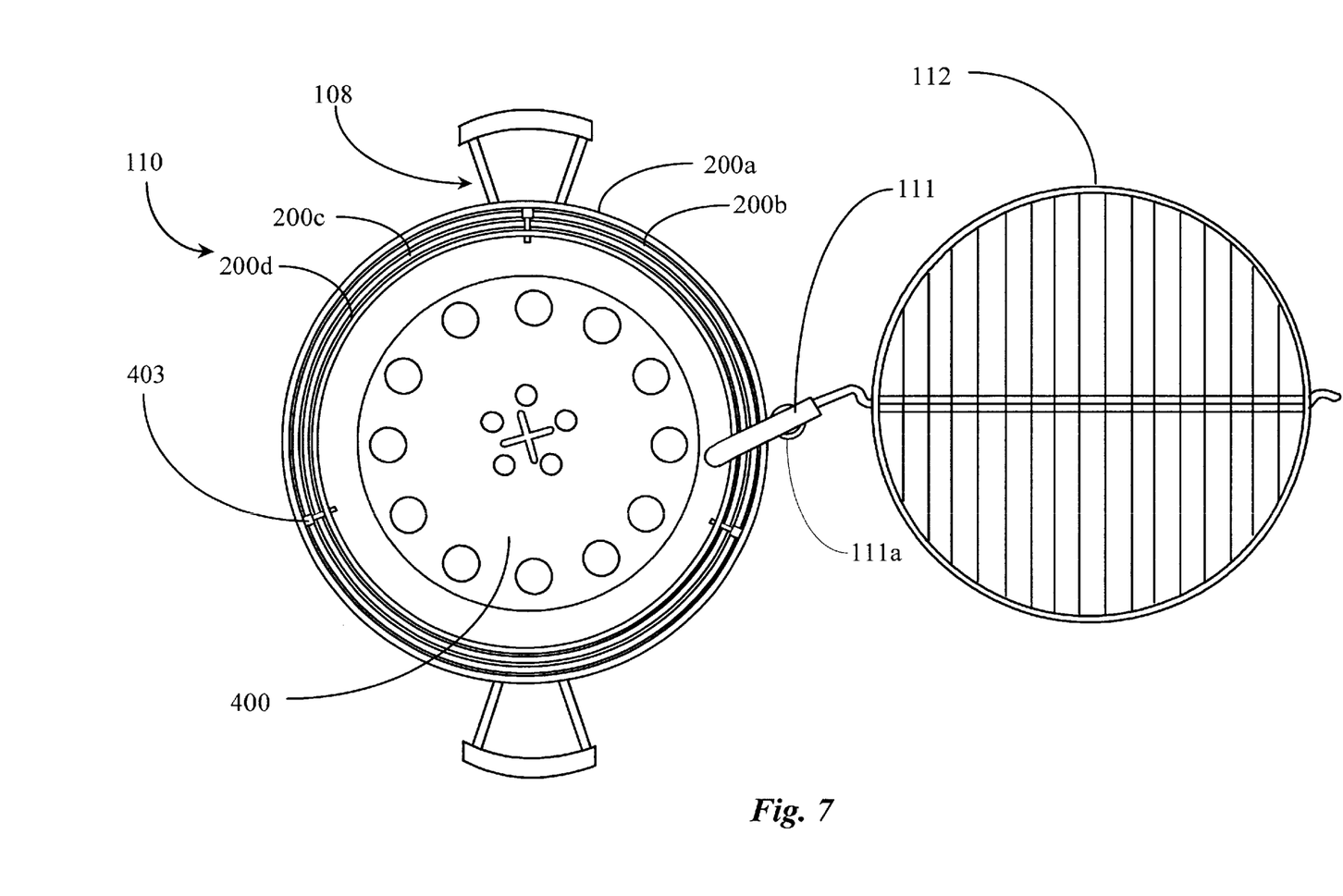
FIG. 7 is an overhead plan view of body 110 of FIG. 6 illustrating a grilling rack removed from the grill via a lift handle.

FIG. 7 is an overhead view of body 110 of FIG. 6 illustrating rack 112 removed from the grill via a lift handle 111. In this example grill body 110 is illustrated in a collapsed configuration as was described with reference to the example of FIG. 6 above. Segment 200d is shelved on pins 403. Heat baffle 400 is visible in the bottom of segment 200d. Handle 111 is removably attached to grilling rack 112 in this example. Handle 111 is part of an assembly described with reference to the example of FIG. 1. A sleeve 111a supporting handle 111 is part of a frame support apparatus (not shown) that supports body 110 on the opposite side of body 110 from stand 103 as was described with reference to FIG. 1. Lift handle 111 enables rack 112 to be elevated above body 110 and swung out to the side for convenience in loading and unloading food away from the heat source, and for access to elements within the body of the system.

Handles 108 are illustrated in this embodiment and are mounted to cooking segment 200d as previously described. While section 200d is resting on pins 403, segments 200b and 200c are resting substantially on handles 108. Lift handle 111 may also be attached to the cover (102) described with reference to FIG. 1, to facilitate manipulation of the cover. In some embodiments shelves and other apparatus may be added around the upper segment of the system for convenience.

Figure 8:
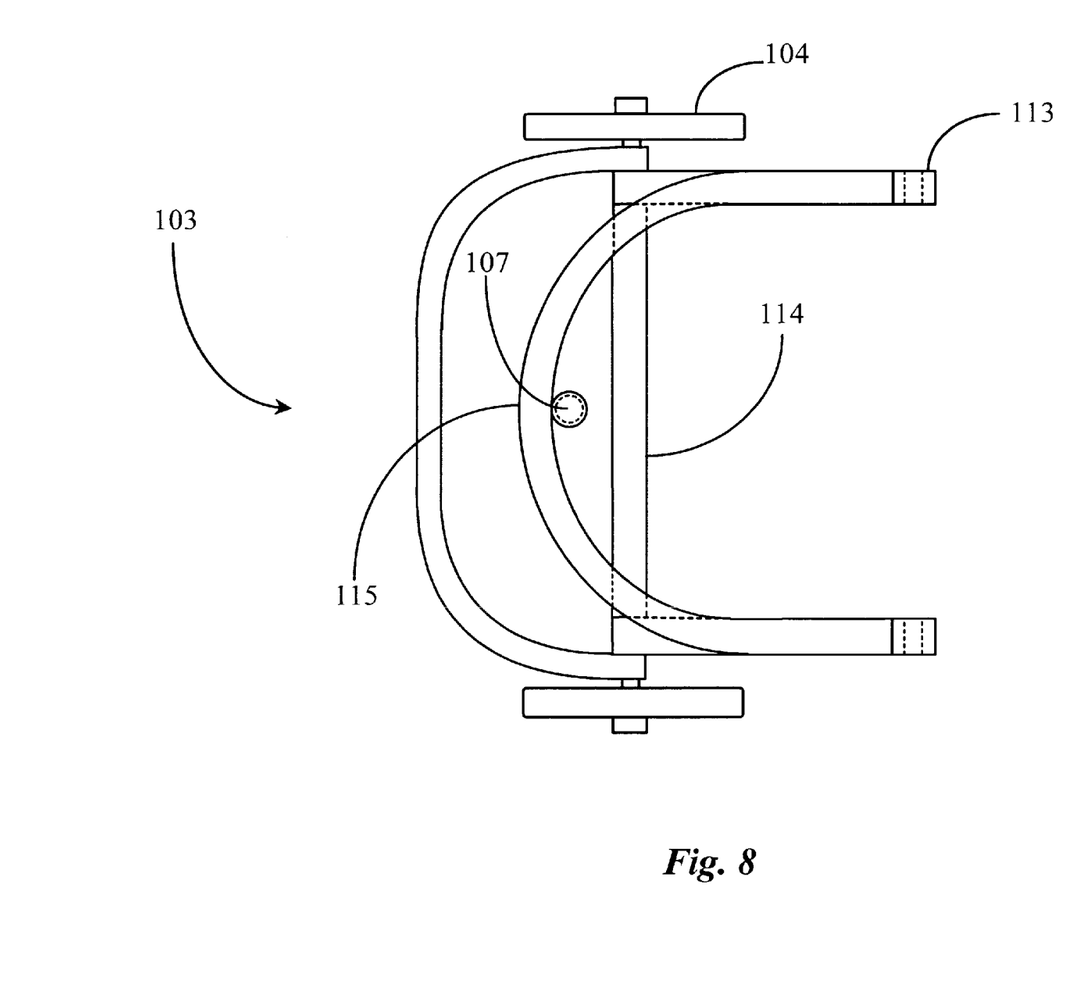
FIG. 8 is an overhead view of the stand of FIG. 1 illustrated folded upon itself for storage convenience.

FIG. 8 is an overhead view of stand 103 of FIG. 1 illustrated as folded upon itself for convenience in storage. Folding-hinges 113 enable the folded configuration, and are of a nature that they may be locked in extended position for positional integrity. Base portion 115 supports foot 107. Foot 107 supports a stand arm (not shown) for supporting one side of grill body 110 when stand 103 is extended. In one embodiment joint locations 113 support hinges. In other embodiments, flexible materials may be used instead of solid hinges. There are a number of possibilities. Stand 103 may be operated like a hand truck regardless of the configuration of base portion 115 (folded or not). A lock lever (not shown) may be provided to joints 113 to lock them either in a folded or extended configuration. The range of fold is slightly less than 180 degrees in this example. In another embodiment, stand 103 may be provided without the foldable feature.

Figure 9:
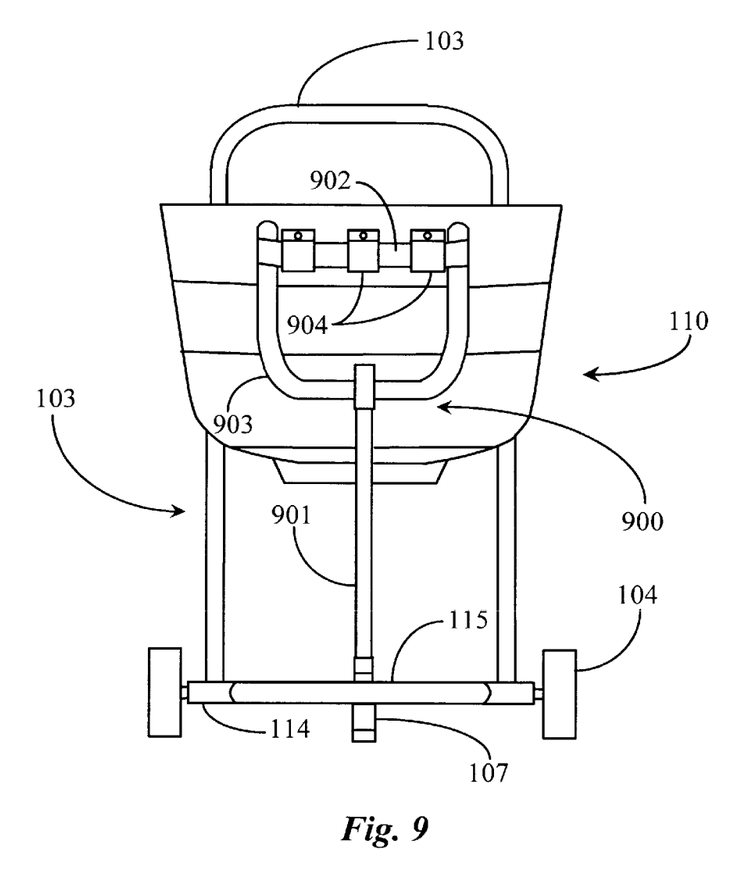
FIG. 9 is a plan view of the stand of FIG. 1 supporting grill body 110 of FIG. 1 with aid of a support arm.

FIG. 9 is an elevation of the system and stand 103 of FIG. 1 supporting grill body 110 of FIG. 1 with aid of a support apparatus 900. As described with reference to FIG. 1, stand 103 has a separable support arm provided therewith for supporting the opposite side of grill body 110 from the side visible with respect to FIG. 1.

Support arm 900 comprises a post 901, a fork member 903, and a cross-piece 902. Post 901 is, in a preferred embodiment, formed of steel tubing having an outside diameter slightly smaller than the inside diameter of foot 107 so that it can be inserted therein and seated for support. Fork member 903 is preferably formed of steel tubing as well. Fork member 903 is rigidly attached to post 901 by welding or other known methods. Fork member 903 is curved upward to form 2 support fingers. Cross-member 902 is rigidly attached to fork member 903 across its support fingers by welding, bolting or other suitable fastening method.

A plurality of clips 904 (3 in this example) are provided and attached to grill body 110 in an array adapted retain grill body 110 onto strap 902 to provide hanging support for the grill in a similar fashion described with respect to strap 109 and clips 116 of FIG. 1. The methods of attachment of clips 904 to grill body 110 may be by welding, riveting, metal screws, or other known methods. Cross-member. 902 is analogous to strap 109 described with respect to FIG. 1.

When not being used, support arm 900 is removed from foot 107 and can be stored with stand 103. In a preferred embodiment, a separate holding sleeve or perhaps metal clips may be provided on one or both of the upright members of stand 103 so that support arm 900 may be fastened thereto when it is not being used to aid in the support of grill body 110. Also when stand 103 is not in use supporting grill body 110, base portion 115 of stand 103 can be folded over on itself to save space for convenient storage as previously described with respect to the example of FIG. 8 above.

It will be apparent to the skilled artisan that the suspension apparatus and method adapts the system, without the stand, to be mounted to other rails or members, such as may be adapted to a balcony railing, for example, making the system useful for urban settings for apartments and condominiums.

Figure 10:
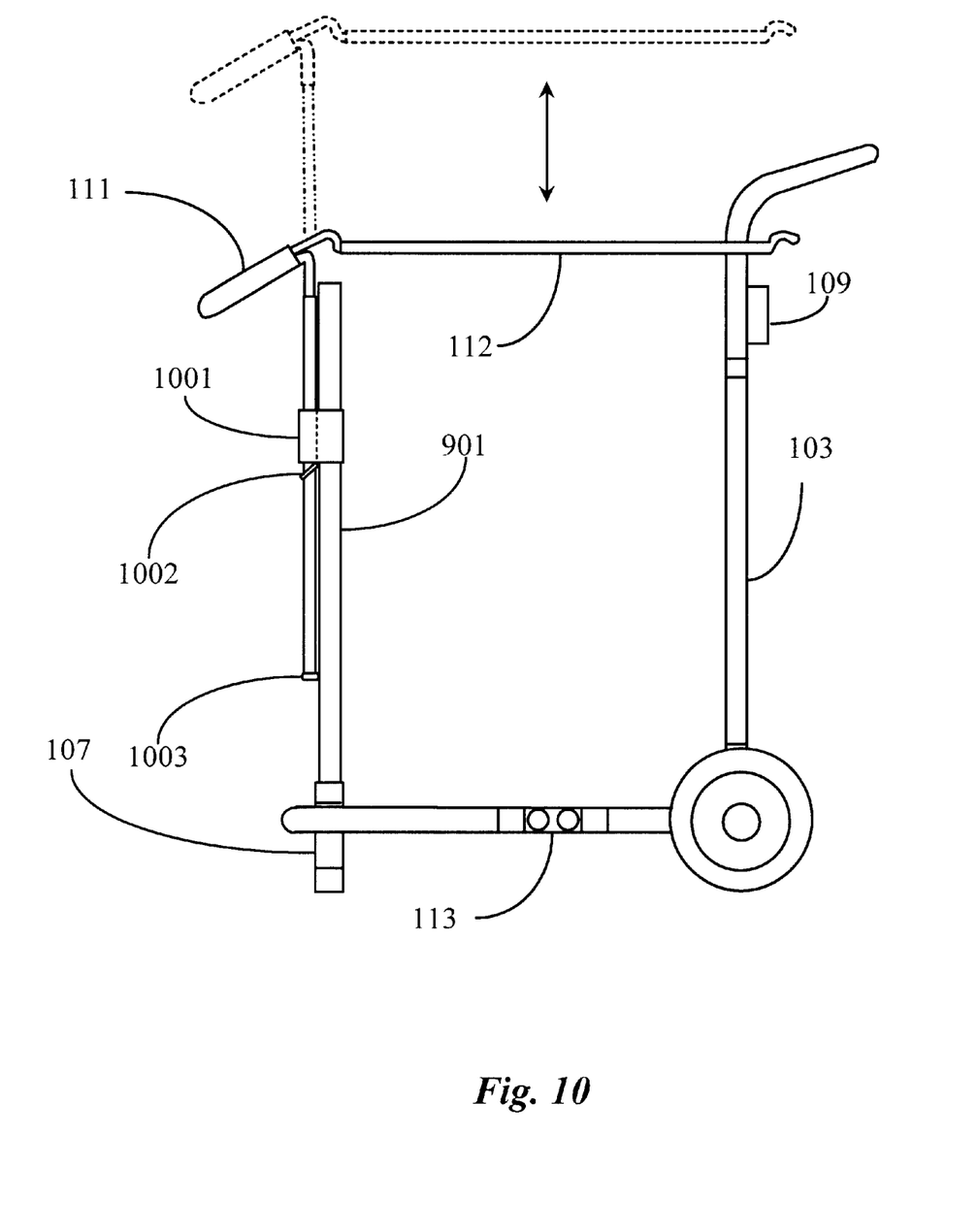
FIG. 10 is an elevation view of the stand of FIG. 1 equipped with a pull-rod lift-handle according to an embodiment of the invention.

FIG. 10 is an elevation view of stand 103 equipped with pull-rod lift-handle 111 according to an embodiment of the invention. Post 901 is illustrated in a seated position within foot 107. Fork member 903 described with reference to FIG. 9 above is not illustrated in this example for reason of clarity in illustration. Lift handle 111 is attached to grill rack 112 as was described with reference to the example of FIG. 7 above. In this example, a rod housing 1001 is provided and adapted for retention on post 901 by virtue of an opening provided therethrough, the opening of a diameter slightly larger than the outside diameter of post 901. Similarly, rod housing 1001 has a second opening provided therethrough having an inside diameter slightly larger than the outside diameter of the pull rod portion of handle 111 shown cut off in FIG. 1. Housing 1001 may be retained on post 901 using a retention screw or any one of several other methods known in the art.

A stop ring 1002 is provided to fit over the pull rod portion of handle 111 and adapted to provide frictional retention to the pull rod at the lower side of its opening in housing 1001. A user may manipulate stop ring 1002 by hand to release friction against the pull rod so the rod may be moved up or down in its sleeve. A ring stop 1003 is provided at the end of the pull rod to retain ring 1002 onto the pull rod. In one embodiment, stop 1003 is removable such as by un-screwing for the purpose of removing lift handle 111 from post 901 altogether. In other embodiments, other retention apparatus and methods such as are known in the art may be used to adjust the height of handle 111 with respect to post 901. To raise or lower handle 111 a user manipulates stop ring 1002 to release the pull rod. Then he or she raises or lowers freely slidable handle 111 to a desired position of height, then manipulates ring 1002 to retain the rod at its positioned height. A raised position is illustrated by a broken boundary in the shape of handle assembly 111.

Figure 11:
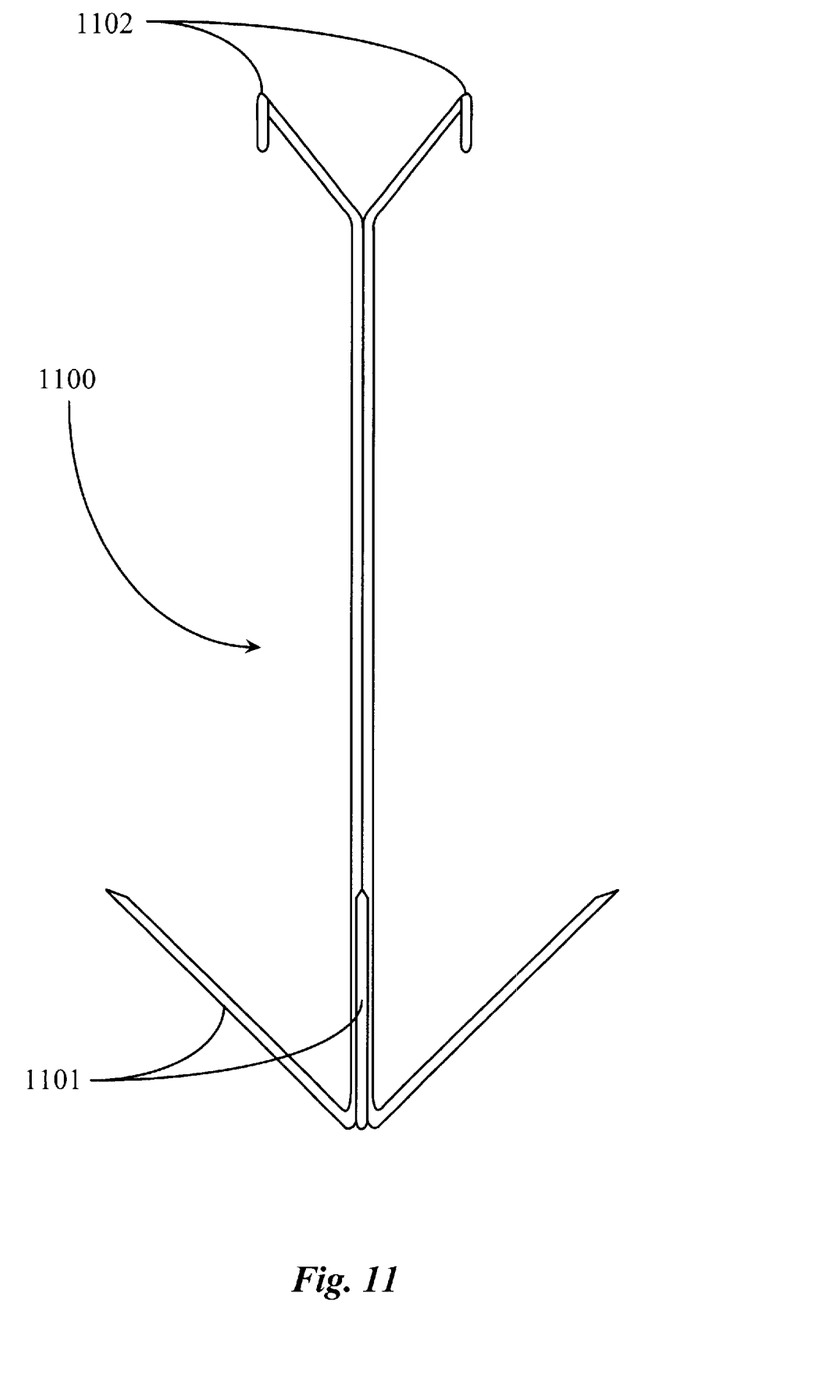
FIG. 11 is a plan view of a suspension hook for suspending items to be cooked in grill body 110, shown at full extension.

FIG. 11 is a plan view of a suspension hook 1100 for suspending items to be cooked, such as turkey, chicken or roasts in grill body 110 with the system at full extension. Suspension hook 1100 in a preferred embodiment is manufactured from heavy gauge steel wire welded or bolted together to from a treble hook configuration of a length sufficient to suspend items for cooking from a grill rack analogous to rack 112 of FIG. 1. Hook 1100 has 3 prongs 1101 formed of the wire and sharpened on one end to hold a food item in a state of suspension. This hook in use functions like a rotisserie, in that the items being cooked are surrounded by heat.

Hook 1100 has 2 suspension arms 1102 formed thereon for enabling suspension from the grilling rack. In one embodiment suspension arms 1102 are removable to facilitate easier loading of items onto the hook. In a preferred embodiment, a plurality of hooks 1100 can be used simultaneously when grill body 110 is at full extension. Baskets of similar hanging configuration may be provided, as described briefly above, for suspending other items to be cooked from rack 112 inside the body of the system.

One with skill in the art will recognize that the unit of the present invention is versatile and has multiple uses. The unit, because of the telescoping feature and the multiple grills and baskets, can be used in a wide variety of ways for smoking and cooking. For example, one may cook with a skillet or griddle on a top rack while baking or grilling on a lower rack. In another example, one may be baking on the top rack while grilling or roasting on one or more lower racks. Portability and easy storage is achievable with grill body 110 fully collapsed and base portion 115 of stand 103 is folded over on itself. In one embodiment, a version of stand 103 and system 100 can be provided and adapted for mounting to a recreational vehicle. Grill body 110 when fully collapsed can be easily stored in a sidemounted storage box provided next to hardware for mounting stand 103. In yet another embodiment, the system of the invention can be provided in a version that is usable on a houseboat or other watercraft. There are many such possible embodiments.

The method and apparatus of the invention is to be allowed the broadest possible interpretation under examination. The spirit and scope of the invention is limited only by the following claims.

What is claimed is:

1. A cooking system for outdoor cooking comprising;
   a body for enclosing items to be cooked; and
   one or both of a charcoal pan and a gas burner for providing heat for cooking;
   characterized in that the body is formed of a plurality of ring segments of sequentially smaller size, arranged such that the body may be collapsed telescopically to form a cooking chamber of a first height, or extended from the collapsed state to form a cooking chamber of a second, substantially greater height.

2. The system of claim 1 comprising a gas burner unit having two or more separate manifolds and burners, and a valved control system for feeding gas selectively to one or more of the manifolds and burners.

3. The system of claim 2 further comprising an automatic spark lighting system operable in conjunction with the valved control system.

4. The system of claim 2 wherein, in the valved control system, a single knob feeds gas to the burners selectively, depending on the rotary positions of the knob.

5. The system of claim 1 having both a charcoal pan and a gas burner system.

6. The system of claim 1 wherein an upper ring segment has pins and a lower ring segment has slots, one or more of the slots having a horizontal as well as a vertical component, such that the lower segment may be raised, collapsing intervening segments telescopically, and the slots may be engaged on the pins to hold the unit collapsed.

7. The system of claim 1 further comprising a domed lid for covering the body in use.

8. The system of claim 1 further comprising a wheeled carriage assembly for supporting the system in use and/or for portability.

9. The system of claim 8 wherein the body mounts to the carriage assembly by two or more downward-facing brackets, fitting over a cross-member of the carriage.

10. The system of claim 8 wherein a portion of the wheeled carriage assembly is foldable upon itself to facilitate convenience in storage.

11. The system of claim 1 further comprising a plurality of grill racks and supports for the racks at various heights within the extended body.

12. The system of claim 1 further comprising one or more of grill racks and a cover and a lift handle assembly for attaching to and elevating a grill rack or cover above the body and moving the rack or cover to one side of the system.

13. The system of claim 1 further comprising at least one suspension hook for suspending food items from a grill rack down into the body.

14. A method for enhancing functionality of an outdoor cooking system having a body for enclosing items to be cooked, comprising the steps of:
   (a) forming the body in a plurality of ring segments of sequentially smaller size;
   (b) arranging the segments such that the body may be collapsed telescopically to form a cooking chamber of a first height, or extended from the collapsed state to form a cooking chamber of a second, substantially greater height.

* * * * *